(12) United States Patent
Griffith et al.

(10) Patent No.: US 11,587,689 B2
(45) Date of Patent: Feb. 21, 2023

(54) NUCLEAR FUEL ELEMENTS INCLUDING PROTECTIVE STRUCTURES, AND RELATED METHOD OF FORMING A NUCLEAR FUEL ELEMENT

(71) Applicant: Battelle Energy Alliance, LLC, Idaho Falls, ID (US)

(72) Inventors: George W. Griffith, Idaho Falls, ID (US); Isabella J. van Rooyen, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 17/072,903

(22) Filed: Oct. 16, 2020

(65) Prior Publication Data

US 2021/0202116 A1     Jul. 1, 2021

Related U.S. Application Data

(60) Provisional application No. 62/928,037, filed on Oct. 30, 2019.

(51) Int. Cl.
| | | |
|---|---|---|
| G21C 3/20 | (2006.01) | |
| G21C 3/28 | (2006.01) | |
| G21C 3/62 | (2006.01) | |
| G21C 21/02 | (2006.01) | |

(52) U.S. Cl.
CPC ............. *G21C 3/20* (2013.01); *G21C 3/28* (2013.01); *G21C 3/623* (2013.01); *G21C 3/626* (2013.01); *G21C 21/02* (2013.01)

(58) Field of Classification Search
CPC ... G21C 3/20; G21C 3/28; G21C 3/58; G21C 3/626; G21C 3/16
USPC ............. 376/414, 416, 426, 428, 431, 455
See application file for complete search history.

(56) References Cited

U.S. PATENT DOCUMENTS

| | | | | |
|---|---|---|---|---|
| 3,039,944 A | * | 6/1962 | Zumwalt | G21C 21/02 |
| | | | | 376/418 |
| 4,582,676 A | | 4/1986 | Chubb | |
| 4,894,203 A | * | 1/1990 | Adamson | G21C 3/20 |
| | | | | 376/416 |
| 5,991,354 A | * | 11/1999 | Van Swam | G21C 3/623 |
| | | | | 376/455 |
| 8,506,836 B2 | | 8/2013 | Szuromi et al. | |
| 9,666,310 B1 | * | 5/2017 | Mariani | G21C 3/07 |

(Continued)

OTHER PUBLICATIONS

Harp, Jason M., et al. Preliminary investigation of candidate materials for use in accident resistant fuel. No. INL/CON-13-28403. Idaho National Laboratory (INL), 2013. (Year: 2013).*

(Continued)

*Primary Examiner* — Jack W Keith
*Assistant Examiner* — Jinney Kil
(74) *Attorney, Agent, or Firm* — TraskBritt

(57) ABSTRACT

A nuclear fuel element includes a core comprising a fissile element and an additional element. A protective structure surrounds the core and comprises at least a first material surrounding the nuclear fuel. The first material comprises the fissile element and the additional element and comprises a greater than stoichiometric amount of the additional element. An outer portion of the nuclear fuel element comprises a metal. Related nuclear fuel elements, and related methods are also disclosed.

20 Claims, 6 Drawing Sheets

(56) References Cited

U.S. PATENT DOCUMENTS

| | | | |
|---|---|---|---|
| 2013/0220495 A1* | 8/2013 | Park | G21C 21/10 |
| | | | 148/557 |
| 2014/0185733 A1* | 7/2014 | Povirk | G21C 3/20 |
| | | | 376/417 |
| 2017/0040069 A1 | 2/2017 | Francesco | |
| 2017/0043555 A1* | 2/2017 | Xu | G21C 17/0225 |
| 2018/0264679 A1 | 9/2018 | Van Rooyen et al. | |
| 2021/0020321 A1* | 1/2021 | Lahoda | G21C 3/20 |

OTHER PUBLICATIONS

Finlay, M. R., and M. I. Ripley. "A new fuel for research reactors." (2001). (Year: 2001).*

Krautwasser, P., G. M. Begun, and Peter Angelini. "Raman spectral characterization of silicon carbide nuclear fuel coatings." Journal of the American Ceramic Society 66.6 (1983): 424-434. (Year: 1983).*

* cited by examiner

NUCLEAR FUEL ELEMENTS INCLUDING PROTECTIVE STRUCTURES, AND RELATED METHOD OF FORMING A NUCLEAR FUEL ELEMENT

CROSS-REFERENCE TO RELATED APPLICATION

This application claims the benefit under 35 U.S.C. § 119(e) of U.S. Provisional Patent Application Ser. No. 62/928,037, filed Oct. 30, 2019, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to nuclear fuel materials comprising a nuclear fuel and a protective structure disposed around the nuclear fuel, a protective material disposed within a nuclear fuel, and to related methods. More particularly, embodiments of the disclosure relate to nuclear fuel materials comprising a nuclear fuel including a protective structure disposed around the nuclear fuel or a getter material dispersed within the nuclear fuel, and to related methods of forming the nuclear fuel materials by additive manufacturing.

BACKGROUND

As the global population increases, the demand for energy is expected to continue to increase. Methods of energy production include coal gas filed power plants, natural gas energy production, renewable energy (e.g., wind, wood, solar, hydroelectric, biofuels), and nuclear power generation, among other methods. Nuclear energy production may be advantageous due to reduced pollution relative to other forms of energy production due to relatively low cost, stable load of energy, and minimal emissions.

Nuclear power generation includes the use of nuclear reactions in a nuclear reactor core to provide power. The nuclear reactions may include fission of enriched uranium to generate power. The enriched uranium may be provided to the nuclear reactor core in the form of fuel pellets, which may be disposed in fuel rods that are, in turn, disposed in the nuclear reactor core.

The fuel rods are often surrounded by a cladding material to physically separate the nuclear fuel from an external environment, such as from thermal transfer fluids (e.g., water) that are used to drive, for example, turbines for power generation. Unfortunately, during use and operation of the nuclear reactor, the cladding materials may be exposed to excessing temperatures, pressures, and other environments that may facilitate corrosion of the cladding materials. When the cladding material corrodes, the fuel pellets within the fuel rods may be exposed to the thermal transfer fluids (e.g., coolants). However, exposure of the fuel pellets to the thermal transfer fluids may result in dissolution or erosion of the fuel pellets, reducing the effectiveness of the nuclear fuel.

BRIEF SUMMARY

Embodiments disclosed herein include nuclear fuel materials formed by additive manufacturing, and to related methods of forming the nuclear fuel materials. For example, in accordance with one embodiment, a nuclear fuel material comprises a core comprising a fissile element and an additional element, and a protective structure around the core. The protective structure comprises the fissile element and the additional element, the protective structure comprising a greater than stoichiometric amount of the additional element, and a metal comprising an outer portion of the protective structure.

Additional embodiments are directed to a method of forming a nuclear fuel material. In accordance with one embodiment, a method of forming a nuclear fuel material comprises providing a first feed material in a reaction vessel, the first feed material comprising a fissile element and an additional element, exposing the first feed material to energy from an energy source to form a nuclear fuel comprising the fissile element and the additional element, providing a second feed material comprising at least a metal around an outer portion of the nuclear fuel, and exposing the second feed material to energy from the energy source to form a protective structure around the nuclear fuel and to form inter granular bonds between the nuclear fuel and the protective structure.

In accordance with additional embodiments of the disclosure, a nuclear fuel material comprises a matrix material comprising a fissile element and an additional element, and one or more getter materials dispersed within the matrix material.

DETAILED DESCRIPTION

Figure 1A:
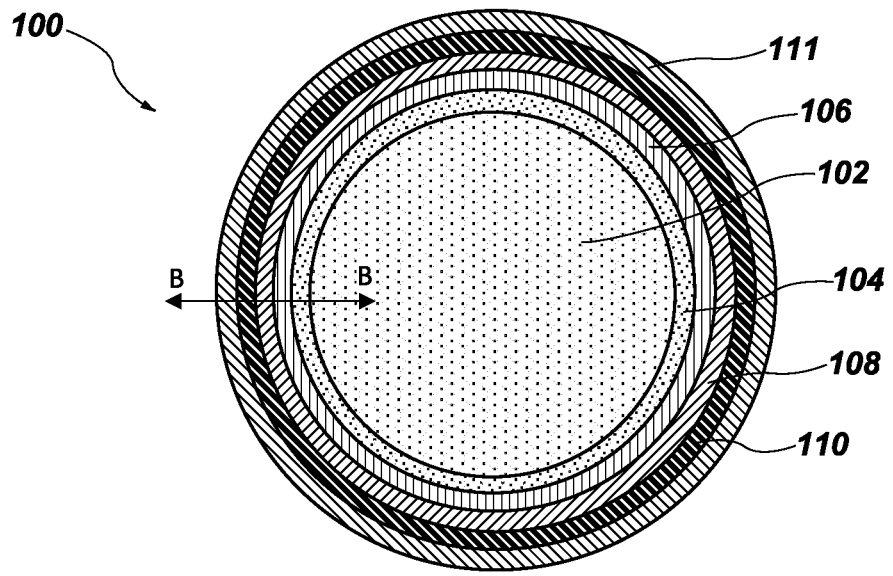
FIG. 1A is a simplified planar cross-sectional view of nuclear fuel element, in accordance with embodiments of the disclosure.

Illustrations presented herein are not meant to be actual views of any particular material, component, or system, but are merely idealized representations that are employed to describe embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or system for forming a material with additive manufacturing, or for a nuclear fuel material, a component of a nuclear reactor core, another structure, or related methods. Only those process acts and structures necessary to understand the embodiments of the disclosure are described in detail below. Additional acts to form a material, such as a nuclear fuel material, by additive manufacturing may be performed by conventional techniques. Further, any drawings accompanying the present application are for illustrative purposes only and, thus, are not drawn to scale. Additionally, elements common between figures may retain the same numerical designation.

According to embodiments described herein, a nuclear fuel element (e.g., such as a nuclear fuel pellet) may be formed by additive manufacturing. Forming the nuclear fuel element by additive manufacturing may facilitate forming the nuclear fuel element to exhibit desired properties. In some embodiments, the nuclear fuel element may be additively manufactured to exhibit a resistance to corrosion or erosion, such as responsive to exposure to one or more thermal transfer fluids of a nuclear reactor (e.g., coolants, such as water, steam). In some embodiments, the nuclear fuel element comprises a nuclear fuel and a protective material around the nuclear fuel. The nuclear fuel may comprise at least one element configured to undergo a nuclear reaction, such as by fission. In some embodiments, the at least one element of the nuclear fuel comprises a fissile actinide element capable of undergoing and sustaining nuclear fission. The at least one element configured to undergo a nuclear reaction may be referred to herein as a "fissile" element. The nuclear fuel may further include at least one additional element. The protective material may comprise a gradient of the fissile element and exhibit a decreasing concentration (atomic percent) of the fissile element with an increasing distance from the nuclear fuel. An outer, exposed surface of the nuclear fuel element may comprise a material that is formulated and configured to exhibit a resistivity to corrosion, erosion, or both within the nuclear reactor. The exposed surface may comprise a metal, a metal carbide, a metal nitride, or a metal carbide nitride. A concentration of the metal may increase from a location proximate the nuclear fuel to the outer portions of the nuclear fuel element.

In other embodiments, a nuclear fuel element comprises a matrix material comprising a nuclear fuel (e.g., at least one fissile element configured to under nuclear fission) and one or more getter materials dispersed within the matrix material. The one or more getter materials may be formulated and configured to getter (e.g., chemically react with, bind, grab) one or more materials that may otherwise corrode or erode the nuclear fuel element. In some embodiments, the one or more getter materials are formulated and configured to interact with oxygen atoms, hydrogen atoms, or both. The one or more getter materials may include, for example, one or more of silicon, oxygen, carbon, nitrogen, chromium, tantalum, tungsten, niobium, titanium, yttrium, aluminum, zirconium, hafnium, molybdenum, and cerium. In some embodiments, a concentration of the one or more getter materials is substantially uniform throughout the nuclear fuel element. In other embodiments, outer portions of the nuclear fuel element include a relatively greater concentration of the one or more getter materials than internal portions of the nuclear fuel element.

The nuclear fuel elements may be fabricated by additive manufacturing. In some embodiments, forming the nuclear fuel elements by additive manufacturing may facilitate fabrication of the nuclear fuel elements to include one or more materials formulated and configured to exhibit desired properties (e.g., corrosion resistance, erosion resistance) without degradation of the nuclear properties of the nuclear fuel. By way of nonlimiting example, fuel pellets may be fabricated with a protective structure around a circumference thereof, with dispersed getter materials, or both, without degradation of the properties of the nuclear fuel pellets. In addition, the nuclear fuel elements may be fabricated with integral additives, diffusion barriers, or both. Forming the protective structure, the getter materials, the additives, and the diffusion barriers by additive manufacturing facilitates forming such materials at desired locations within the nuclear fuel elements.

Figure 1B:
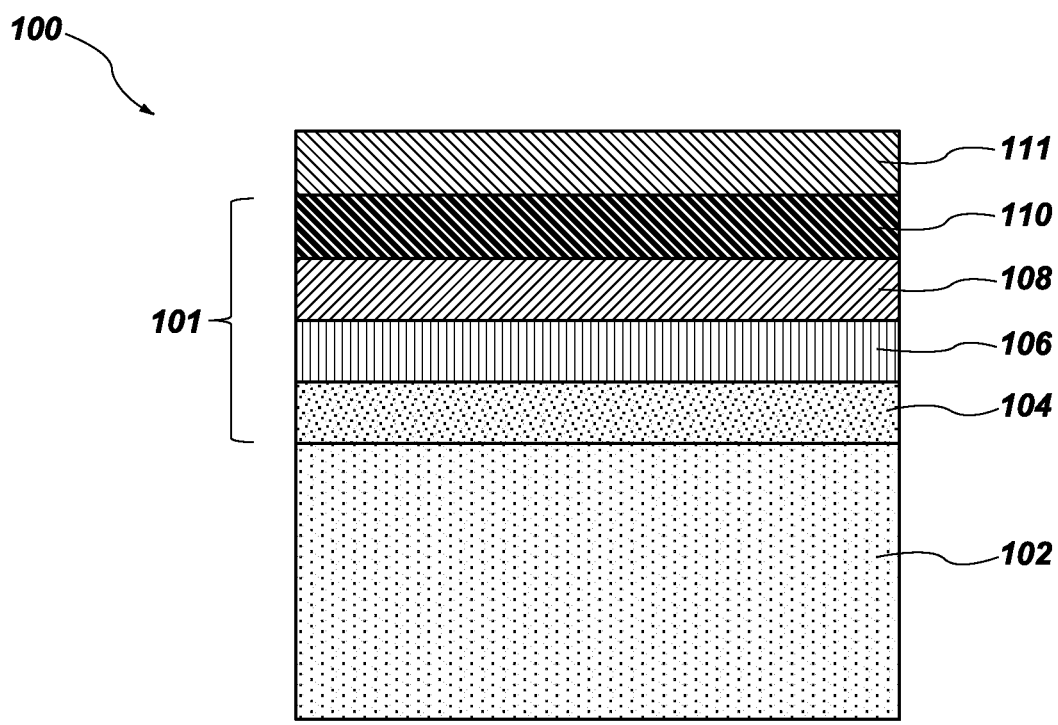
FIG. 1B is a simplified cross-sectional view of the nuclear fuel element of G. IA taken through section line B-B, in accordance with embodiments of the disclosure.

FIG. 1A is a simplified planar cross-sectional view of nuclear fuel element 100 and FIG. 1B is a simplified cross-sectional view of the nuclear fuel element 100 of FIG. 1A taken through section line B-B, in accordance with embodiments of the disclosure. The nuclear fuel element 100 may be include one or more protective layers formulated and configured to improve the corrosion resistance, the erosion resistance, or both of a nuclear fuel element 100 without substantially affecting properties of the nuclear fuel element 100. In some embodiments, the nuclear fuel element 100 comprises a fuel pellet comprising at least a portion of, for example, a fuel rod. In some embodiments, the nuclear fuel element 100 comprises a fuel pellet that is disposed within a fuel rod. However, the disclosure is not so limited and the nuclear fuel element 100 may comprise another structure. In some embodiments, a cladding material 111 substantially surrounds the nuclear fuel element 100.

The nuclear fuel element 100 may include a core comprising a nuclear fuel 102 and a protective structure 101 disposed around the nuclear fuel 102. The protective structure 101 may, in some embodiments, include a first material 104 surrounding the nuclear fuel 102, a second material 106 surrounding the first material 104, a third material 108 surrounding the second material 106, and a fourth material 110 surrounding the third material 108.

A thickness of the protective structure 101 may be within a range of from about 1 μm to about 1 mm, such as from about 1 μm to about 5 μm, from about 5 μm to about 10 μm, from about 10 μm to about 50 μm, from about 50 μm to about 100 μm, from about 100 μm to about 200 μm, from about 200 μm to about 500 μm, of from about 500 μm to about 1 mm. However, the disclosure is not so limited and the thickness of the protective structure 101 may be different than those described above.

The nuclear fuel 102 may comprise at least one element exhibiting nuclear properties. For example, the nuclear fuel 102 may include at least one element capable of undergoing and sustaining nuclear fission (e.g., at least one fissile element, such as uranium, plutonium, thorium, one or more other transuranic elements, such as fissile actinide elements). In addition to the at least one fissile element, the nuclear fuel 102 may include at least one additional element. The at least one additional element may comprise, for example, one or more of silicon, oxygen, carbon, nitrogen, chromium, tantalum, tungsten, niobium, titanium, yttrium, aluminum, zirconium, hafnium, molybdenum, cerium, iron, nickel, cobalt, scandium, bismuth, and copper. In some embodiments, the at least one additional element comprises silicon. In other embodiments, the at least one additional element comprises oxygen. In some embodiments, the at least one additional element comprises a plurality of additional elements forming a high entropy alloy (HEA). High entropy alloys may include alloys including two or more (e.g., three of more, four or more, five or more) of silicon, oxygen, carbon, nitrogen, chromium, tantalum, tungsten, niobium, titanium, yttrium, aluminum, zirconium, hafnium, molybdenum, cerium, cobalt, iron, manganese, nickel, lithium, magnesium, copper, vanadium, bismuth, and scandium. Nonlimiting examples of HEAs include, for example, cobalt chromium iron manganese nickel (CoCrFeMnNi), vanadium niobium molybdenum tantalum tungsten (VNbMoTaW), aluminum cobalt chromium copper iron nickel (AlCoCrCuFeNi, such as $Al_{0.5}CoCrCuFeNi$), aluminum lithium magnesium scandium titanium ($Al_{20}Li_{20}Mg_{10}Sc_{20}Ti_{30}$), niobium tantalum molybdenum tungsten (NbTaMoW), cobalt chromium copper iron nickel (CoCrCuFeNi), bismuth iron cobalt nickel manganese (BiFeCoNiMn), and titanium niobium hafnium zirconium titanium (TaNbHfZrTi). In some embodiments, the HEAs may include a composite HEA including a dispersed material within a matrix material. In some embodiments, the dispersed material comprises an HEA and the matrix material comprises a ceramic material (e.g., a carbide, a nitride, a silicide). In other embodiments, the dispersed material comprises a ceramic material and the matrix material comprises a HEA.

By way of nonlimiting example, the nuclear fuel 102 may include uranium metal, uranium silicide, uranium molybdenum, uranium dioxide, uranium carbide, uranium nitride, uranium sesquisilicide, thorium sesquisilicide, hafnium sesquisilicide, cerium sesquisilicide, palladium silicide, neodymium silicide, praseodymium silicide, lanthanum silicide, uranium-zirconium (U—Zr) alloys, uranium-plutonium-zirconium (U—Pt—Zr) alloys, uranium-zirconium-palladium (U—Zr—Pd) alloys, uranium-zirconium-palladium-neodymium (U—Zr—Pd—Nd) alloys, uranium-zirconium-palladium-cerium (U—Zr—Pd—Ce) alloys, uranium-zirconium-palladium-praseodymium (U—Zr—Pd—Pr) alloys, uranium-zirconium-palladium-lanthanum (U—Zr—Pd—La) alloys, or other materials. In some embodiments, the nuclear fuel 102 comprises a high-grade nuclear fuel, such as a uranium-containing nuclear fuel element. In some embodiments, the nuclear fuel 102 comprises uranium silicide ($U_3Si_2$). In some such embodiments, the nuclear fuel 102 may comprise a so-called accident tolerant fuel (ATF) due to its thermo-physical properties (e.g., relatively high thermal conductivity and relatively high melting point). In other embodiments, the nuclear fuel 102 comprises uranium oxide (e.g., uranium dioxide).

The first material 104 may include the at least one fissile element and the at least one additional element. Although the first material 104 comprises the same elements as the nuclear fuel 102, the first material 104 may include different proportions of the fissile element and the additional element. In some embodiments, the first material 104 comprises a greater than stoichiometric amount of the additional element. For example, where the additional material comprises silicon (e.g., such as where the nuclear fuel 102 comprises uranium silicide), the first material 104 comprises a silicon rich material (e.g., silicon rich uranium silicide). In some such embodiments, the first material 104 comprises a less than stoichiometric amount of the fissile element.

The second material 106 may include an alloy comprising a metal and the at least one additional element of the nuclear fuel 102 and the first material 104. The metal may include, for example, one or more of zirconium, molybdenum, beryllium, plutonium, hafnium, cerium, tungsten, thorium, chromium, tantalum, niobium, titanium, yttrium, silicon, aluminum, silicon, nickel, cobalt, scandium, bismuth, and copper. In some embodiments, the metal may be mixed with carbon (e.g., to comprise a carbide), nitrogen (e.g., to comprise a nitride), oxygen (e.g., to comprise an oxide), or two or more of carbon, nitrogen, or oxygen. In some embodiments, the metal comprises zirconium. In other embodiments, the metal comprises thorium. In yet other embodiments, the metal comprises yttrium. In further embodiments, the metal comprises hafnium. As will be described herein, in some embodiments, the metal comprises at least one element of a cladding material (e.g., zircalloy) that is disposed around a circumference of the nuclear fuel element 100.

The metal may constitute from about 30 atomic percent to about 70 atomic percent of the second material 106, such as from about 30 atomic percent to about 40 atomic percent, from about 40 atomic percent to about 50 atomic percent, from about 50 atomic percent to about 60 atomic percent, or from about 60 atomic percent to about 70 atomic percent. The additional element may constitute a remaining portion of the second material 106. In some embodiments, the metal constitutes about 50 atomic percent of the second material 106 and the additional element constitutes about 50 atomic percent of the second material 106. In some embodiments, the second material 106 comprises a stoichiometric amount of the metal and the additional element.

The third material 108 may include the same elements as the second material 106 but may include a different atomic percent of each of the elements thereof. In some embodiments, the third material 108 may include a higher atomic percent of the metal than the second material 106 and a lower atomic percent of the additional element than the second material 106. In some embodiments, the third material 108 comprises a greater than stoichiometric amount of the metal (and a corresponding less than stoichiometric amount of the additional element).

The metal may constitute from greater than about 50 atomic percent (e.g., about 51 atomic percent) to about 99 atomic percent of the third material 108, such as from about 51 atomic percent to about 60 atomic percent, from about 60 atomic percent to about 70 atomic percent, from about 70 atomic percent to about 80 atomic percent, from about 80 atomic percent to about 90 atomic percent, or from about 90 atomic percent to about 99 atomic percent of the third material 108. The additional element may constitute a remaining portion of the third material 108. By way of nonlimiting example, the additional element may constitute from about 0.1 atomic percent to about 49.9 atomic percent of the third material 108, such as from about 0.1 atomic percent to about 1 atomic percent, from about 1 atomic percent to about 5 atomic percent, from about 5 atomic percent to about 10 atomic percent, from about 10 atomic percent to about 20 atomic percent, from about 20 atomic percent to about 30 atomic percent, from about 30 atomic percent to about 40 atomic percent, or from about 40 atomic percent to about 49.9 atomic percent of the third material 108.

The fourth material 110 may include the metal. In some embodiments, the fourth material 110 consists essentially of the metal. In some embodiments, the metal is formulated to be inert or substantially inert to one or more materials to which the nuclear fuel element 100 may be exposed during use and operation. In some embodiments, the fourth material 110 comprises more than one metal, such as more than one of zirconium, molybdenum, beryllium, plutonium, hafnium, cerium, tungsten, thorium, chromium, tantalum, niobium, titanium, yttrium, silicon, aluminum, silicon, nickel, cobalt, scandium, bismuth, and copper. In some embodiments, the fourth material 110 comprises zirconium and the nuclear fuel 102 comprises uranium silicide. In other embodiments, the fourth material 110 comprises thorium oxide and the nuclear fuel 102 comprises uranium dioxide. In other embodiments, the fourth material 110 comprises silicon carbide and the nuclear fuel 102 comprises uranium silicide. In some such embodiments, the second material 106 may include silicon and carbon, the third material 108 may include silicon and carbon, and the fourth material 110 may include silicon carbide. The composition of the second material 106, the third material 108, and the fourth material 110 may be the same in some such embodiments. In yet other embodiments, the fourth material comprises an alloy of iron, chromium, and aluminum and the nuclear fuel 102 comprises uranium silicide. In further embodiments, the nuclear fuel 102 comprises uranium nitride and the protective material comprises silicon carbide. In some embodiments, the nuclear fuel 102 comprises uranium silicide, the fourth material 110 comprises silicon carbide, and one or more of the first material 104, the second material 106, and the third material 108 comprises one or more of yttrium oxide, thorium oxide, and hafnium oxide. In some embodiments, the one or more of the first material 104, the second material 106, and the third material 108 comprises thorium oxide. In other embodiments, the one or more of the first material 104, the second material 106, and the third material 108 comprises yttrium oxide.

In yet other embodiments, the protective structure 101 comprises one or more of $Y_2O_3$, $ThO_2$, Al—Mg, Al—Ni, Al—Cu, Al—Ni—Cu, Al—Si, Co—Cu, Cu—Be, Cu—Zn, Cu—Au, Cu—Ag, Au—Pt, Au—Ni, Ti—V, Ti—Mo, Ti—Nb, Ti—Ta, Ti—Zr, Ti—Fe, Ti—Cr, Ti—Ni, Ti—Cr, Fe—C, Fe—N, Nb—W, Mg—Al, Ni—Cr, Ni—Cu, U—Th, U—Ti, and U—Cr. In some embodiments, the protective structure 101 exhibits a gradient of such materials, a concentration of such materials increasing from a location proximate the nuclear fuel 102 to locations distal from the nuclear fuel 102.

Although FIG. 1A and FIG. 1B have been described and illustrated as including the protective structure 101 comprising distinct portions (e.g., the first material 104, the second material 106, the third material 108, and the fourth material 110), the disclosure is not so limited. In some embodiments, the protective structure 101 comprises a gradient of one or more of the fissile element, the additional element, and the metal. For example, the protective structure 101 may comprise a gradient of the metal with a maximum atomic percent of the metal distal from the nuclear fuel 102 and a decreasing atomic percent of the metal with a decreasing distance from the nuclear fuel 102. In other words, a concentration of the metal may increase with an increasing distance from the nuclear fuel 102. In some such embodiments, the protective structure 101 may be substantially free of the metal proximate the nuclear fuel 102. Accordingly, the protective structure 101 may exhibit a maximum concentration of the metal proximate outer portions (e.g., external portions) thereof and a decreasing concentration of the metal in a direction toward a center of the nuclear fuel element 100. In some embodiments, a concentration of the metal proximate the nuclear fuel 102 may be about 0 and may increase from the second material 106 to the fourth material 110.

The nuclear fuel element 100 may include a decreasing atomic percent of fissile element with an increasing distance from the nuclear fuel 102. In some such embodiments, the atomic percent of the fissile element may be greatest proximate the nuclear fuel 102 and decrease to about 0 atomic percent proximate an outer surface of the nuclear fuel element 100.

Accordingly, the nuclear fuel element 100 may include the protective structure 101 disposed around the nuclear fuel 102 core. The protective structure 101 may comprise a gradient of materials rather than a distinct coating over the nuclear fuel 102. Accordingly, the protective structure 101 may be integrally formed with the nuclear fuel element 100 rather than a separate coating or layer over the nuclear fuel 102.

In some embodiments, the protective structure 101 comprises a high entropy alloy (HEA). High entropy alloys may include alloys including two or more (e.g., three of more, four or more, five or more) of silicon, oxygen, carbon, nitrogen, chromium, tantalum, tungsten, niobium, titanium, yttrium, aluminum, zirconium, hafnium, molybdenum, cerium, cobalt, iron, manganese, nickel, lithium, magnesium, copper, vanadium, bismuth, and scandium. Nonlimiting examples of high entropy alloys include, for example, cobalt chromium iron manganese nickel (CoCrFeMnNi), vanadium niobium molybdenum tantalum tungsten (VNbMoTaW), aluminum cobalt chromium copper iron nickel (AlCoCrCuFeNi, such as $Al_{0.5}$CoCrCuFeNi), aluminum lithium magnesium scandium titanium ($Al_{20}Li_{20}Mg_{10}Sc_{20}Ti_{30}$), niobium tantalum molybdenum tungsten (NbTaMoW), cobalt chromium copper iron nickel (CoCrCuFeNi), bismuth iron cobalt nickel manganese (BiFeCoNiMn), and titanium niobium hafnium zirconium titanium (TaNbHfZrTi). In some embodiments, fissile element may describe with a distance from the outer portions of the nuclear fuel 102.

In some embodiments, one or both of the protective structure 101 and the nuclear fuel 102 may include one or more additives. Nonlimiting examples of additives include carbon nanotubes (e.g., single wall carbon nanotubes, double wall carbon nanotubes, multiwall carbon nanotubes), fibers (e.g., carbon fibers), carbon black, graphene, or other materials. In some embodiments, the additive comprises carbon nanotubes. In some such embodiments, the carbon nanotubes may provide structural integrity and strength to the nuclear fuel element 100. In addition, the carbon nanotubes may form carbides with fission products and may interact with oxygen during use and operation of the nuclear fuel element 100. In some embodiments, the additives exhibit a corrosion resistance and are added to the protective structure 101. A concentration of the additives may be within a range from about 1 ppm (about 0.0001 atomic percent) to about 1,000 ppm, such as from about 1 ppm to about 5 ppm, from about 5 ppm to about 10 ppm, from about 10 ppm to about 100 ppm, from about 100 ppm to about 500 ppm, or from about 500 ppm to about 1,000 ppm. A size of the additives may be within a range from about 1 nm to about 100 nm, such as from about 1 nm to about 5 nm, from about 5 nm to about 10 nm, from about 10 nm to about 20 nm, from about 20 nm to about 50 nm, or from about 50 nm to about 100 nm.

In some embodiments, the nuclear fuel element 100 may include a diffusion barrier. The diffusion barrier may be formulated and configured to allow fission gases to be removed from the nuclear fuel element 100 (e.g., from the nuclear fuel 102 and out of the nuclear fuel element 100), while also preventing diffusion of oxygen from an external environment into the nuclear fuel element 100. In some embodiments, the diffusion barrier is located between the nuclear fuel 102 and the protective structure 101. The diffusion barrier may comprise, for example, zirconium carbide.

Figure 2A:
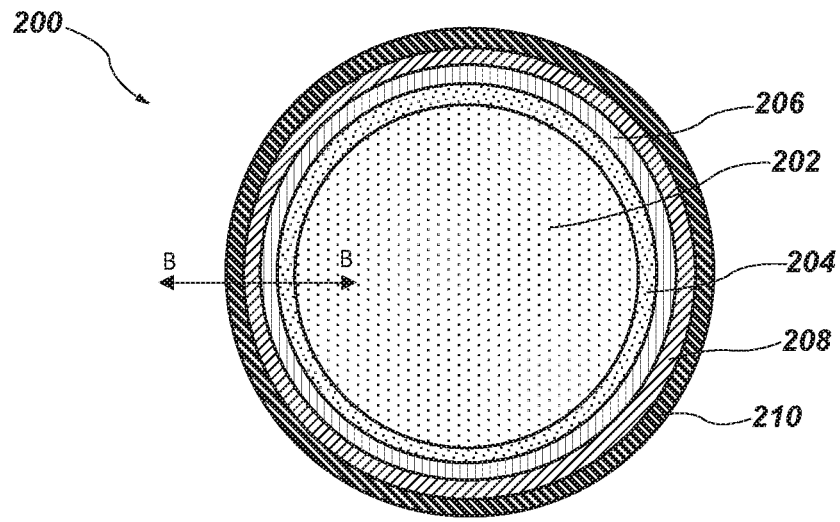
FIG. 2A is a simplified planar cross-sectional view of another nuclear fuel element, in accordance with embodiments of the disclosure.
Figure 2B:
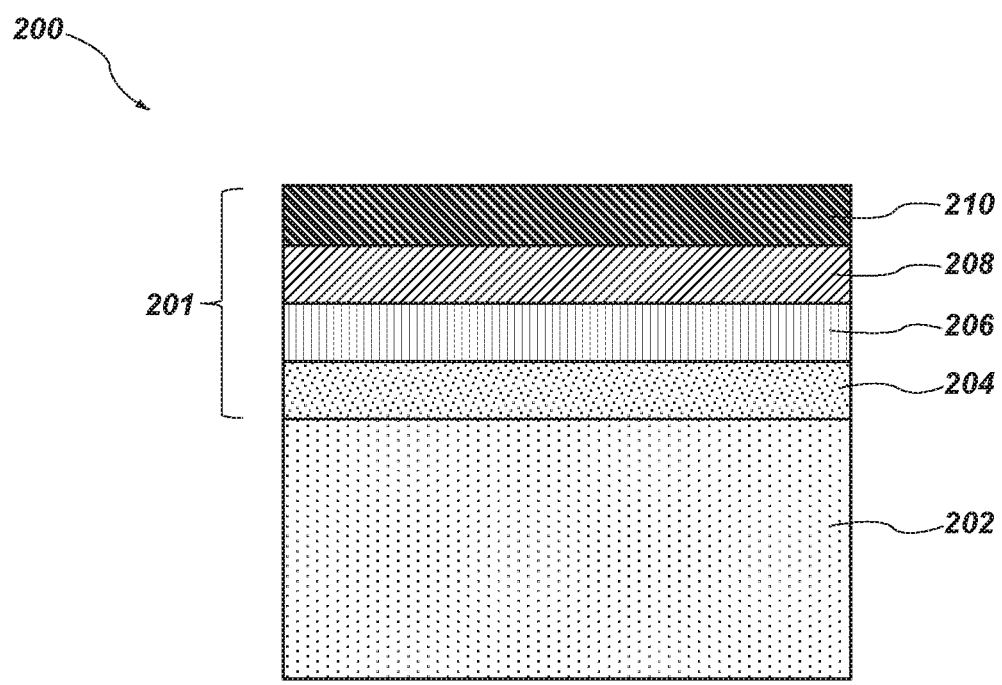
FIG. 2B is a is a simplified cross-sectional view of the nuclear fuel element of FIG. 2A taken through section line B-B, in accordance with embodiments of the disclosure.

FIG. 2A is a simplified planar cross-sectional view of nuclear fuel element 200 and FIG. 2B is a simplified cross-sectional view of the nuclear fuel element 200 of FIG. 2A taken through section line B-B, in accordance with embodiments of the disclosure. As described above with reference to the nuclear fuel element 100, the nuclear fuel element 200 may comprise a fuel pellet comprising at least a portion of, for example, a fuel rod. In some embodiments, the nuclear fuel element 200 comprises a fuel pellet that is disposed within a fuel rod. However, the disclosure is not so limited and the nuclear fuel element 100 may comprise another structure. In some embodiments, a cladding material substantially surrounds the nuclear fuel element 200.

The nuclear fuel element 200 may include a core comprising a nuclear fuel 202 and a protective structure 201 around the nuclear fuel 202. The protective structure 201 may include a first material 204 surrounding the nuclear fuel 202, a second material 206 surrounding the first material 204, a third material 208 surrounding the second material 206, and a fourth material 210 surrounding the third material 208. A thickness of the protective structure 201 may be the same as the thickness of the protective structure 101 described above.

The nuclear fuel 202 and the first material 204 may be substantially the same as the nuclear fuel 102 and the first material 104, respectively, described above with reference to FIG. 1A and FIG. 1B.

The second material 206 may comprise a fissile element and one or both of carbon and nitrogen. The fissile element may be the same as that described above with reference to the nuclear fuel 102 (FIG. 1A, FIG. 1B). In some embodiments, the second material 206 comprises the fissile element and carbon. In other embodiments, the second material 206 comprises the fissile element and nitrogen. In yet other embodiments, the second material 206 comprises the fissile element, carbon, and nitrogen.

The fissile element may constitute from about 30 atomic percent to about 70 atomic percent of the second material 206, such as from about 30 atomic percent to about 40 atomic percent, from about 40 atomic percent to about 50 atomic percent, from about 50 atomic percent to about 60 atomic percent, or from about 60 atomic percent to about 70 atomic percent. The carbon, nitrogen, or both may constitute a remaining portion of the second material 206. In some embodiments, the fissile element constitutes about 50 atomic percent of the second material 206 and the carbon, nitrogen, or both constitutes about 50 atomic percent of the second material 206.

The third material 208 may comprise a metal and one or more of carbon, nitrogen (e.g., nitrogen atoms), and oxygen (e.g., oxygen atoms). In some embodiments, the third material 208 comprises the metal and one of carbon or nitrogen. In other embodiments, the third material 208 comprises one of carbon or oxygen. In some embodiments, the third material 208 includes carbon and the second material 206 includes carbon. In other embodiments, the third material 208 includes nitrogen and the second material 206 includes nitrogen. In yet other embodiments, the third material 208 includes oxygen (e.g., oxygen atoms) and the second material 206 includes oxygen.

The metal may include one or more of the metals described above with reference to the metal of the fourth material 110 (FIG. 1A, FIG. 1B).

In some embodiments, the third material 208 may comprise a greater than a stoichiometric amount of the metal. In some such embodiments, the third material 208 comprises less than a stoichiometric amount of other elements thereof (e.g., carbon, nitrogen, or both).

By way of nonlimiting example, the metal may constitute from greater than about 50 atomic percent (e.g., about 51 atomic percent) to about 99 atomic percent of the third material 108, such as from about 51 atomic percent to about 60 atomic percent, from about 60 atomic percent to about 70 atomic percent, from about 70 atomic percent to about 80 atomic percent, from about 80 atomic percent to about 90 atomic percent, or from about 90 atomic percent to about 99 atomic percent of the third material 208.

The fourth material 210 may include a metal and one or more of carbon, nitrogen, or oxygen. In some embodiments, the fourth material 210 comprises the same elements as the third material 208, but comprises a stoichiometric amount of the metal and the one or more of carbon, nitrogen, or oxygen.

In some embodiments, the nuclear fuel element 200 comprises a decreasing concentration of the fissile element with an increasing distance from the nuclear fuel 202. In some such embodiments, the nuclear fuel element 200 may exhibit a maximum concentration of the fissile element at the nuclear fuel 202 with a substantially zero concentration of the fissile element proximate the third material 208.

Accordingly, the nuclear fuel element 200 may include the protective structure 201 disposed around the nuclear fuel 202 core. The protective structure 201 may comprise a gradient of materials rather than a distinct coating over the nuclear fuel 202. Accordingly, the protective structure 201 may be integrally formed with the nuclear fuel element 200 rather than a separate coating or layer over the nuclear fuel 202.

As described above with reference to FIG. 1A and FIG. 1B, the nuclear fuel element 200 may include one or more additives and may include a diffusion barrier.

Figure 3A:
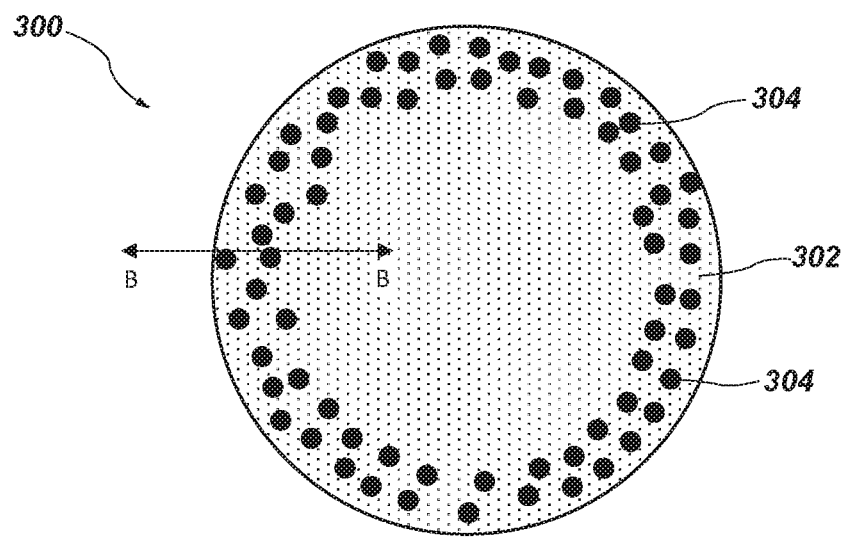
FIG. 3A is a simplified planar cross-sectional view of nuclear fuel element, in accordance with embodiments of the disclosure.
Figure 3B:
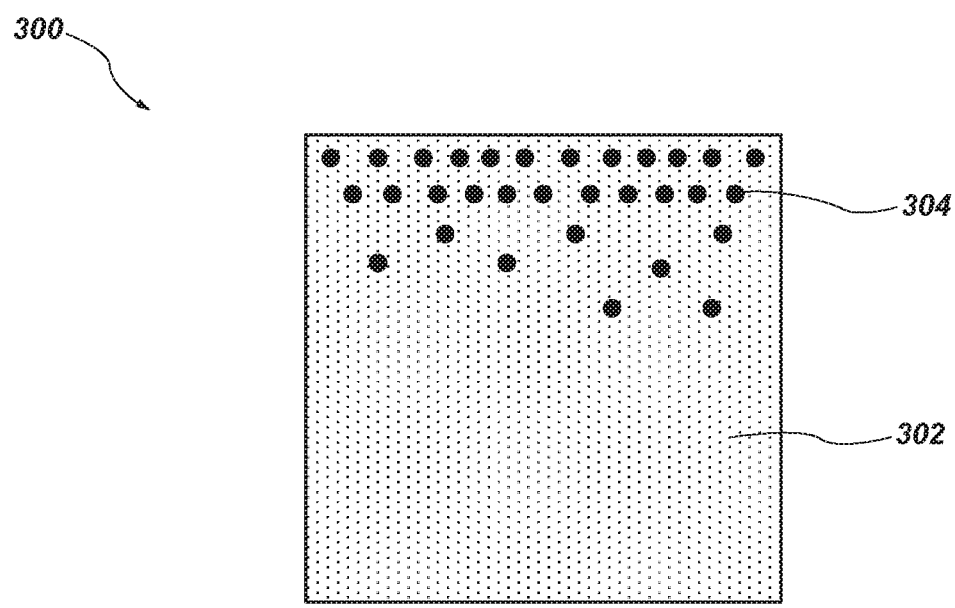
FIG. 3B is a simplified cross-sectional view of the nuclear fuel element of FIG. 3A taken through section line B-B, in accordance with embodiments of the disclosure.

FIG. 3A is a simplified planar cross-sectional view of nuclear fuel element 300 and FIG. 3B is a simplified cross-sectional view of the nuclear fuel element 300 of FIG. 3A taken through section line B-B, in accordance with embodiments of the disclosure. With reference to FIG. 3A and FIG. 3B, the nuclear fuel element 300 may include a matrix material 302 comprising a nuclear fuel (e.g., one or more fissile elements), which may comprise one or more of the materials described above with reference to the nuclear fuels 102, 202. In some embodiments, the matrix material 302 comprises uranium silicide. In other embodiments, the matrix material 302 comprises uranium dioxide (e.g., highly enriched uranium dioxide, low enriched uranium dioxide).

The nuclear fuel element 300 may include one or more materials formulated and configured to improve one or more properties of the nuclear fuel element 300 dispersed within the matrix material 302. For example, the nuclear fuel element 300 may include getter materials 304 (which may also be referred to herein as "grabber" materials) dispersed within the matrix material 302. In some embodiments, the getter materials 304 are formulated and configured to interact with (e.g., chemically react with, bind, grab, getter) one or both of oxygen atoms and hydrogen atoms. By way of nonlimiting example, the getter materials 304 may include one or more of silicon, oxygen, carbon, nitrogen, chromium, tantalum, tungsten, niobium, titanium, yttrium, aluminum, zirconium, hafnium, molybdenum, thorium, and cerium. In some embodiments, the getter materials 304 comprise one or more of zirconium, chromium, and titanium. In other embodiments, the getter materials 304 comprise one or more of thorium or yttrium.

The getter materials 304 may each have a size within a range from about 1.0 nm to about 100 nm, such as from about 1.0 nm to about 2.0 nm, from about 2.0 nm to about 5.0 nm, from about 5.0 nm to about 10 nm, from about 10 nm to about 25 nm, from about 25 nm to about 50 nm, or from about 50 nm to about 100 nm.

A concentration of the getter materials 304 may be within a range from about 0.01 atomic percent to about 1.0 atomic percent of the nuclear fuel element 300, such as from about 0.01 atomic percent to about 0.05 atomic percent, from about 0.05 atomic percent to about 0.10 atomic percent, from about 0.10 atomic percent to about 0.20 atomic percent, from about 0.20 atomic percent to about 0.40 atomic percent, from about 0.40 atomic percent to about 0.60 atomic percent, from about 0.60 atomic percent to about 0.80 atomic percent, or from about 0.80 atomic percent to about 1.0 atomic percent of the nuclear fuel element 300.

In some embodiments, a concentration of the getter material 304 may be greatest at locations proximate an outer portion of the nuclear fuel element 300 (e.g., at a circumference of the nuclear fuel element 300). In some such embodiments, a central portion of the nuclear fuel element 300 may be substantially free of the getter material 304 and the nuclear fuel element 300 may exhibit an increasing concentration of the getter material 304 with an increasing distance from the center of the nuclear fuel element 300.

Figure 3C:
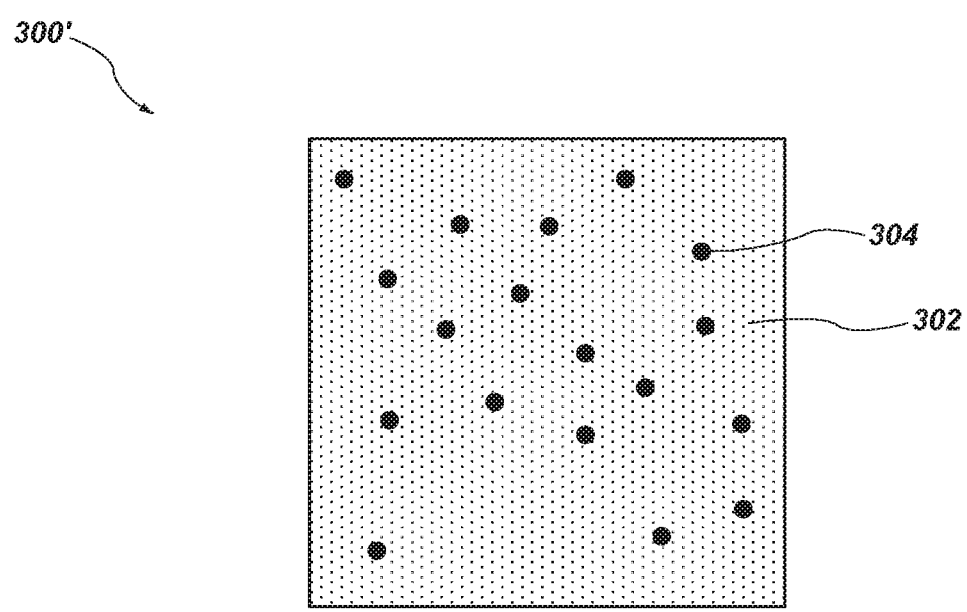
FIG. 3C is a simplified cross-sectional view of a nuclear fuel element, in accordance with additional embodiments of the disclosure.

Although FIG. 3A and FIG. 3B have been described and illustrated as including the nuclear fuel element 300 having a greater concentration of the getter materials 304 proximate the outer portions of the nuclear fuel element 300, the disclosure is not so limited. FIG. 3C is a simplified cross-sectional view of a nuclear fuel element 300' comprising the getter materials 304 dispersed within the matrix material 302 comprising a nuclear fuel. The getter materials 304 may be substantially uniformly dispersed within the matrix material 302. In some such embodiments, a concentration of the getter materials 304 may not be greater at any particular locations within the nuclear fuel element 300' than at other portions of the nuclear fuel element 300'.

As described above with reference to FIG. 1A and FIG. 1B, the nuclear fuel element 300 may include one or more additives and may include a diffusion barrier.

In some embodiments, the nuclear fuel elements 100, 200, 300, 300' described above are formed by additive manufacturing. Forming the nuclear fuel elements 100, 200, 300, 300' by additive manufacturing may facilitate forming the components of the nuclear fuel elements 100, 200, 300, 300' to exhibit desired properties (e.g., corrosion resistance, erosion resistance) without substantially negatively affecting the nuclear properties of the nuclear fuel elements 100, 200, 300, 300'. Accordingly, the nuclear fuel elements 100, 200, 300, 300' may be fabricated with one or more protective materials without fabricating the one or more protective materials separately from the nuclear fuel elements 100, 200, 300, 300'.

Figure 4:
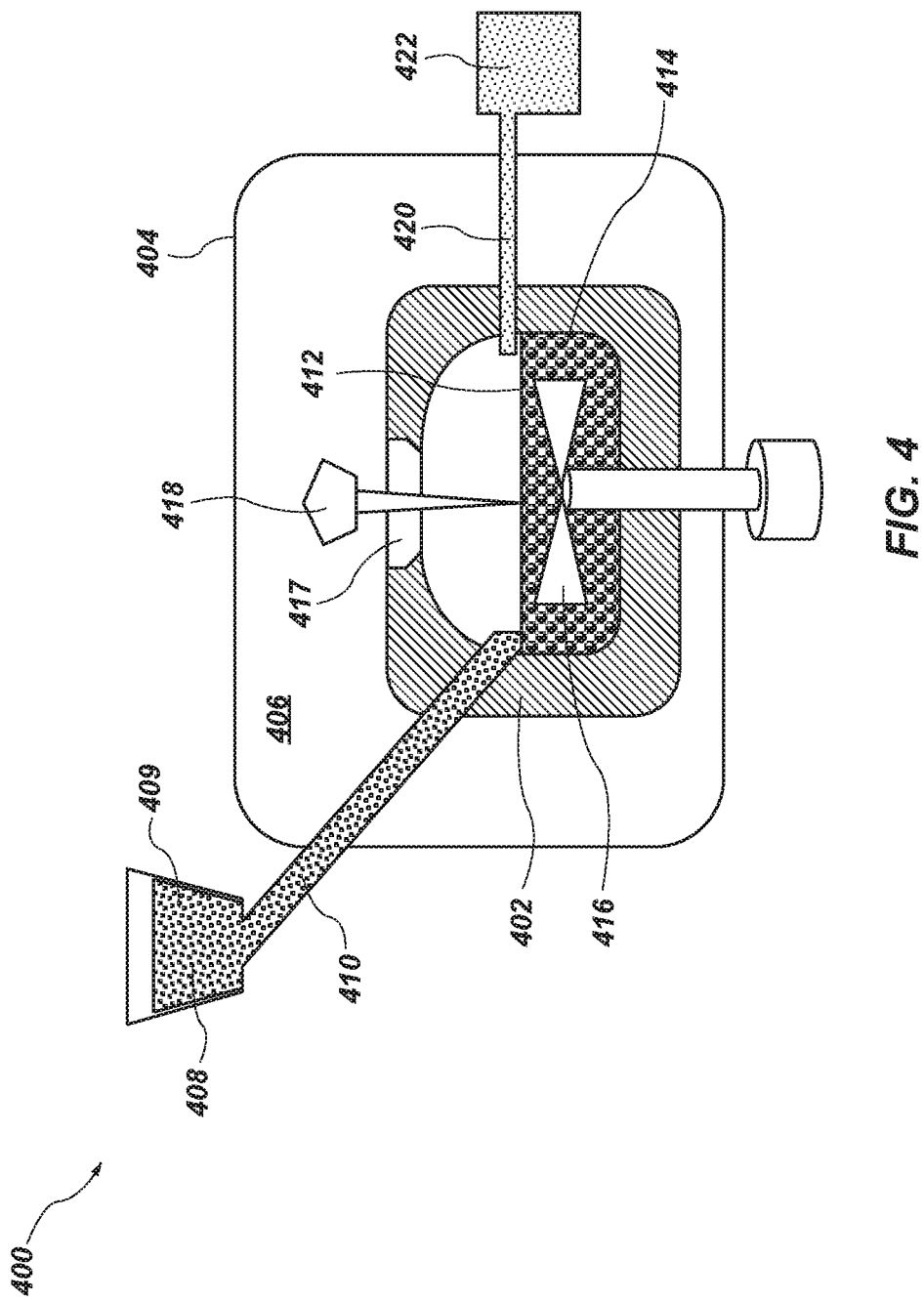
FIG. 4 is a simplified schematic illustrating a system for additively manufacturing a structure, in accordance with embodiments of the disclosure.

FIG. 4 is a simplified schematic illustrating a system 400 for additively manufacturing a structure, in accordance with embodiments of the disclosure. In some embodiments, the system 400 is configured to facilitate directly additively manufacturing materials, such as a nuclear fuel element (e.g., the nuclear fuel element 100, the nuclear fuel element 200, the nuclear fuel element 300, the nuclear fuel element 300'). In some embodiments, the system 400 comprises a laser engineered net shaping (LENS) tool. However, the disclosure is not so limited and the system 400 may comprise another tool for additively manufacturing a structure. In some embodiments, the system 400 is configured to additively manufacture a material from reactants including solid materials (e.g., powders, granules, etc.). The system 400 may be configured to form one or more nuclear fuel elements (e.g., fuel pellets, such as the nuclear fuel element 100, the nuclear fuel element 200, the nuclear fuel element 300, the nuclear fuel element 300'), one or more components of a nuclear reactor (e.g., a neutron reflector material), or other materials.

The system 400 may include a reaction vessel 402 that may be partially surrounded by an outer enclosure 404. Gases from the reaction vessel 402 may be purged therefrom and disposed in a volume 406 between the reaction vessel 402 and the outer enclosure 404. The volume 406 may be filled with one or more of oxygen, carbon monoxide, carbon dioxide, an inert gas (e.g., one or more of argon, helium, nitrogen, neon, another gas), or water vapor.

In some embodiments, the reaction vessel 402 and the outer enclosure 404 are in fluid communication and exhibit substantially the same pressure. In some embodiments, the reaction vessel 402 may be operated at a pressure less than atmospheric pressure. In some such embodiments, the reaction vessel 402 may be operated under a vacuum. The outer enclosure 404 may be operably coupled to a vacuum configured to control a pressure of the outer enclosure 404 and the reaction vessel 402. In some embodiments, the outer enclosure 404 is operably coupled to a tank or other storage vessel wherein gases within the volume 406 may be collected.

A structure 414 being formed within the reaction vessel 402 may be disposed within the reaction vessel 402. The structure 414 may comprise a nuclear fuel element (e.g., the nuclear fuel element 100, the nuclear fuel element 200, the nuclear fuel element 300, the nuclear fuel element 300').

The reaction vessel 402 may be in operable communication with one or more feed materials 408 contained within a feed tank 409. The feed material 408 may be provided to the reaction vessel 402 through a feed conduit 410. Although FIG. 4 illustrates only one feed material 408, one feed tank 409, and one feed conduit 410, the disclosure is not so limited. In other embodiments, the system 400 includes more feed materials, feed tanks, and/or feed conduits, depending on the composition of the structure 414 being formed. For example, in some embodiments, the system 400 may include feed materials corresponding to a composition of the nuclear fuel 102 (FIG. 1A, FIG. 1B), the first material 104 (FIG. 1A, FIG. 1B), the second material 106 (FIG. 1A, FIG. 1B), the third material 108 (FIG. 1A, FIG. 1B), and the fourth material 110 (FIG. 1A, FIG. 1B). In other embodiments, the system 400 includes feed materials corresponding to a composition of the nuclear fuel 202 (FIG. 2A, FIG. 2B), the first material 204 (FIG. 2A, FIG. 2B), the second material 206 (FIG. 2A, FIG. 2B), the third material 208, and the fourth material 210 (FIG. 2A, FIG. 2B). In other embodiments, the system 400 includes feed materials corresponding to a composition of the matrix material 302 (FIG. 3A, FIG. 3B, FIG. 3C) and the getter materials 304 (FIG. 3A, FIG. 3B, FIG. 3C). In some embodiments, various components of the structure 414 may be provided as a feed material 408 premixed. In other embodiments, components of the structure 414 are provided to the structure 414 separately and mixed as they are provided to the structure 414, such as through a nozzle or by their arrangement on the structure 414.

Accordingly, in some embodiments, the feed materials 408 include separate compositions that are configured to be provided to the reaction vessel 402 separated to additively manufacture the structure 414. For example, where the structure 414 comprises the nuclear fuel element 100 (FIG. 1A, FIG. 1B) or the nuclear fuel element 200 (FIG. 2A, FIG. 2B), the feed materials 408 may include five separate compositions each configured to be provided to the reaction vessel 402 separately.

The feed conduit 410 may comprise a conveyor, a pipe, a tube, or another means for transporting the feed material 408 to the reaction vessel 402. The feed conduit 410 may be configured to disposed the feed material 408 over at least portions of an upper surface 412 of the structure 414 formed in the reaction vessel 402. In some embodiments, the feed conduit 410 comprises piping or tubing for disposing (e.g., such as by gravity feeding) the feed materials 408 the reaction vessel 402. Although FIG. 4 illustrates the feed materials 408 as being disposed outside the outer enclosure 404, the disclosure is not so limited. In other embodiments, the feed material 408 and the feed tank 409 may be disposed within the volume 406 and the outer enclosure 404.

The feed material 408 may be provided to the reaction vessel 402 through an atomizer nozzle, which may be configured to heat the feed material 410 as it is provided to the reaction vessel 402. In some embodiments, the feed material 408 is melted as it is provided to the reaction vessel 402.

The feed material 408 may comprise one or more of a powder, granules, an ore, and a solid structure. By way of nonlimiting example, the feed material 408 may include particles having at least one dimension (e.g., a diameter) within a range from about 10 µm to about 1 cm, such as from about 10 µm to about 50 µm, from about 50 µm to about 100 µm, from about 100 µm to about 200 µm, from about 200 µm to about 500 µm, from about 500 µm to about 1 mm, from about 1 mm to about 5 mm, or from about 5 mm to about 1 cm.

In some embodiments, one or more components of the structure 414 may be formed in situ within the reaction vessel 402 for forming the structure 414, as described in U.S. Patent Application Publication No. 2018/0264679, the entire disclosure of which is incorporated herein by reference. In some such embodiments, the feed material 408 includes at least a first component formulated and configured to chemically react with another material and form an additive manufacturing material (e.g., a material having a composition of at least one component of the structure 414 to be formed). As only one example, where the structure 414 includes uranium silicide, the feed materials 408 may include uranium tetrafluoride, uranium hexafluoride, or both and a metal silicide, which may be reacted to form uranium silicide and a metal fluoride in situ, as described in U.S. Patent Application Publication No. 2018/0264679.

In some such embodiments, the system 400 may further include at least one reaction by-product tank 422 configured to receive any reaction by-products formed during the reaction of the feed materials 408. The reaction by-products may be provided to the reaction by-product tank 422 through an exit conduit 420.

An energy source 418 may be configured to provide a concentrated source of energy (e.g., electromagnetic radiation) to at least portions of the upper surface 412 of the structure 414. In some embodiments, the energy source 418 may comprise a laser, an electron beam emitter, or another tool configured to provide a concentrated form of energy to the reaction vessel 402.

The energy source 418 may be disposed within the outer enclosure 404 and configured to provide energy through an opening in the reaction vessel 402, or through, for example, a transparent window 417. The transparent window 417 may be transparent to one or more wavelengths of the energy source 418 and may be, in some embodiments, a laser transparent window. In some embodiments, the energy source 418 is configured to expose the feed material 408 within the reaction vessel 402 (e.g., disposed on the upper surface 412 of the structure 414) to energy. Responsive to exposure to energy, the feed material 408 may be reacted to form intergranular bonds between adjacent particles of the feed material 408.

In other embodiments, responsive to exposure to the energy, a first component of the feed material 408 may react with at least one of at least one reactant material and a second component of the feed material 408 to form at least one reaction product having a desired composition that may be used in an additive manufacturing process in the reaction vessel 402. The reaction vessel 402 may include a mixer 416 configured to separate any reaction by-products from the reaction product. In some embodiments, the reaction product exhibits one or more of a density, a particle, size, or another material property such that the reaction product physically separates from (e.g., moves below) any reaction by-products responsive to mixing by the mixer 416.

The mixer 416 may include a plurality of mixing blades or an auger. In other embodiments, the mixer 416 may be configured to vibrate the structure 414. The mixer 416 may be configured to facilitate sufficient mixing of the feed material 408 to separate reaction products from any reaction by-products. In some embodiments, the mixer 416 is configured to adequately mix the feed material 408 and expose substantially all surfaces thereof to energy from the energy source 418. In some embodiments, the mixer 416 is configured to vibrate the reaction products and prior to exposure thereof to energy from the energy source 418. In some such embodiments, the vibration of the reaction products may increase a number of contact points between particles of the reaction products and may increase a density and decrease a grain size of a resulting structure formed by additive manufacturing.

At least one of the energy source 418 and the structure 414 may be configured to move relative to the other of the energy source 418 and the structure 414. By way of nonlimiting example, at least one of the structure 414 and the energy source 418 may be configured to move in a horizontal direction (e.g., a x-direction, a y-direction, or both), in a vertical direction (e.g., a z-direction), or both. In some embodiments, the structure 414 may be disposed on a movable stage configured to move in one or more directions. In some embodiments, the movable stage may be heated for maintaining a desired temperature of the structure 414.

Figure 5:
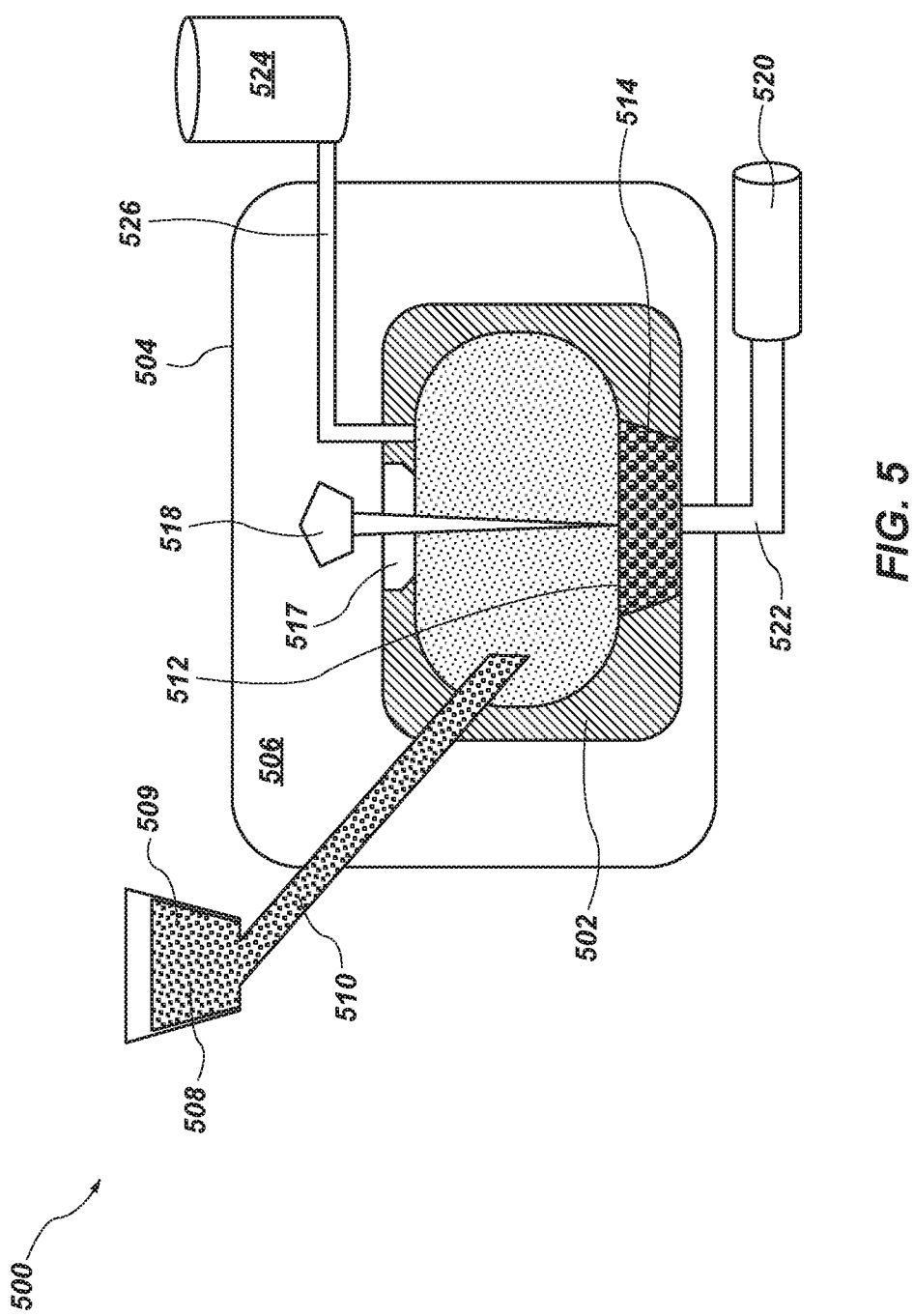
FIG. 5 is a simplified schematic of a system for additively manufacturing a structure, in accordance with embodiments of the disclosure.

FIG. 5 is a simplified schematic of a system 500 for additively manufacturing a structure, in accordance with embodiments of the disclosure. The system 500 may be configured to facilitate directly additively manufacturing materials, such as a nuclear fuel element (e.g., the nuclear fuel element 100, the nuclear fuel element 200, the nuclear fuel element 300, the nuclear fuel element 300'). In some embodiments, the system 500 may be configured to additively manufacture a material from reactants including at least one solid and at least one vapor.

The system 500 may include a reaction vessel 502 in which one or more feed materials may be reacted to form an additive manufacturing material to be used in an additive manufacturing process. Gases from the reaction vessel 502 may be purged and disposed in a volume 506 between the reaction vessel 502 and an outer enclosure 504. The volume 506 may be filled with oxygen, carbon monoxide, carbon dioxide, an inert gas, such as one or more of argon, nitrogen, helium, neon, etc., water vapor, or combinations thereof. A pressure of the reaction vessel 502 and the volume 506 may be less than atmospheric (e.g., vacuum), as described above with reference to the reaction vessel 402 and the volume 406 of FIG. 4.

A feed material 508 may be in communication with the reaction vessel 502 via a feed conduit 510. The feed material 508 may be contained in a feed tank 509. The feed conduit 510 may be configured to dispose the feed material 508 at desired locations within the reaction vessel 502 and on an upper surface 512 of a substrate 514. The feed material 508 may comprise one or more of the materials described above with reference to the feed material 408 (FIG. 4).

In some embodiments, the feed material 508 may be provided to the reaction vessel 502 through an atomizer nozzle, which may be configured to heat the feed material 508 as it is provided to the reaction vessel 502. In some embodiments, the feed material 508 is melted as it is provided to the reaction vessel 502. In some embodiments, the feed conduit 510 may be configured with a selectively movable dispensing head to dispose the feed material 508 in a predetermined pattern and at predetermined locations on the upper surface 512. Although FIG. 5 illustrates the feed material 508 and the feed tank 509 as being disposed outside of the outer enclosure 504, the disclosure is not so limited. In other embodiments, the feed material 508 and the feed tank 509 may be disposed within the volume 506 and the outer enclosure 504.

In some embodiments, the system 500 includes a reactant material 520 operably coupled to the reaction vessel 502 via a reactant conduit 522. The reactant conduit 522 may be configured to provide the reactant material 520 to the reaction vessel 502 at predetermined locations. In some embodiments, the reactant conduit 522 may be configured to provide the reactant material 520 through the substrate 514. In some such embodiments, the substrate 514 may comprise a porous material through which the reactant material 520 may pass. Although FIG. 5 illustrates the reactant conduit 522 being located under the substrate 514, the disclosure is not so limited. In other embodiments, the reactant material 520 may be provided to the reaction vessel 502 from a side thereof, a top thereof, or a combination thereof.

An energy source 518 (e.g., a laser, an electron beam emitter, etc.) may be configured to provide energy to the reaction vessel 502. The energy from the energy source 518 may pass through a transparent window 517 and to the substrate 514 in the reaction vessel 502. The energy source 518 may be configured to provide sufficient energy to initiate a reaction between the feed material 508 and the reactant material 520 at predetermined locations on the upper surface 512. In some embodiments, one or both of the energy source 518 and the substrate 514 may be configured to move relative to each other, such as in one or more of an x-direction, a y-direction, and a z-direction.

An outlet conduit 526 may be operatively coupled to the reaction vessel 502 and configured to remove reaction by-products from the reaction vessel 502 to a reaction by-product vessel 524. The reaction by-product vessel 524 may include one or more materials configured to react with a reaction by-product formed in the reaction vessel 502.

In some embodiments, the system 500 may include a heater, a cooler, or both configured to respectively heat or cool the feed material 508, the substrate 514, or both during use and operation of the system 500.

Accordingly, structures, such as nuclear fuel elements (e.g., fuel pellets), exhibiting desired properties (e.g., corrosion resistance, erosion resistance) may be formed by additive manufacturing. One or more materials may be formed integral with nuclear fuels to impart the desired properties to the nuclear fuel. The one or more materials may be formed to exhibit a gradient within the nuclear fuel element or may be formed at outer portions of the nuclear fuel element.

Although FIG. 1A through FIG. 5 have been described and illustrated as forming a protective structure integral with a nuclear fuel, the disclosure is not so limited. In other embodiments, protective structures may be formed integral with other materials. For example, protective structures may be formed integral with gears, sliding interface bearings, on surfaces of roller elements, turbine blades, or on other structures. By way of nonlimiting example, the protective structure may comprise one or more of Cu—Be, Cu—Zn, Cu—Au, Cu—Ag, Al—Cu, Co—Cu, and Ni—Cu and may be located adjacent to a pump seal, a pump surface, or both. In yet other embodiments, the protective structure comprises a metal carbide, a metal nitride, or a metal carbonitride.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A nuclear fuel element, comprising:
   a core comprising a fissile element comprising uranium and an additional element comprising silicon, the core comprising uranium silicide ($U_3Si_2$); and
   a protective structure around the core, the protective structure comprising:
      a first region comprising a different concentration of the fissile element and the additional element than the core, the first region comprising a greater than stoichiometric amount of the additional element than uranium silicide ($U_3Si_2$) and a greater concentration of the additional element than the core;
      a second region surrounding the first region and comprising a metal and the additional element, the metal comprising from 30 atomic percent to 70 atomic percent of the second region; and
      an outer region of the protective structure around the second region and comprising the metal.

2. The nuclear fuel element of claim 1, further comprising a cladding material around the outer region.

3. The nuclear fuel element of claim 1, wherein the metal comprises one or more of zirconium, yttrium, thorium, and hafnium.

4. The nuclear fuel element of claim 1, wherein the protective structure exhibits a gradient of the fissile element, a concentration of the fissile element decreasing with an increasing distance from the core.

5. The nuclear fuel element of claim 1, wherein the protective structure exhibits a gradient of the additional element.

6. The nuclear fuel element of claim 1, wherein the metal comprises one or more elements selected from zirconium, molybdenum, beryllium, plutonium, hafnium, cerium, tungsten, thorium, chromium, tantalum, niobium, titanium, yttrium, silicon, aluminum, nickel, cobalt, scandium, bismuth, and copper.

7. The nuclear fuel element of claim 1, wherein the metal comprises zirconium silicide.

8. The nuclear fuel element of claim 1, wherein the metal comprises thorium oxide.

9. The nuclear fuel element of claim 1, wherein the metal comprises a metal nitride, a metal oxide, or a metal carbide.

10. The nuclear fuel element of claim 1, wherein the additional element comprises a remaining portion of the second region.

11. The nuclear fuel element of claim 1, wherein the second region further comprises at least one of carbon, nitrogen, and oxygen.

12. The nuclear fuel element of claim 1, wherein the protective structure further comprises a third region adjacent to the second region, the third region comprising the metal and the additional element and comprising a higher atomic percent of the metal than the second region.

13. The nuclear fuel element of claim 12, wherein the third region comprises from 51 atomic percent to 99 atomic percent of the metal.

14. The nuclear fuel element of claim 12, wherein a concentration of the additional element is greater in the first region than in the second region and greater in the second region than in the third region.

15. The nuclear fuel element of claim 12, wherein:
the third region comprises from 51 atomic percent to 99 atomic percent of the metal; and
remaining portions of the third region comprise the additional element.

16. The nuclear fuel element of claim 1, wherein the protective structure comprises one or more additives selected from the group consisting of carbon nanotubes, carbon black, and graphene.

17. A method of forming a nuclear fuel element, the method comprising:
providing a first feed material in a reaction vessel, the first feed material comprising a fissile element comprising uranium and an additional element comprising silicon;
exposing the first feed material to energy from an energy source to form a core of the nuclear fuel element, the core comprising uranium silicide ($U_3Si_2$) formed from the fissile element and the additional element;
providing a second feed material comprising the fissile element, the additional element, and at least a metal around an outer portion of the core; and
exposing the second feed material to energy from the energy source to form a protective structure around the core and to form inter granular bonds between the core and the protective structure, the protective structure comprising:
a first region comprising a different concentration of the fissile element and the additional element than the core, the first region comprising a greater than stoichiometric amount of the additional element than uranium silicide ($U_3Si_2$) and a greater concentration of the additional element than the core;
a second region surrounding the first region and comprising the metal and the additional element, the metal comprising from 30 atomic percent to 70 atomic percent of the second region; and
an outer region of the protective structure around the second region and comprising the metal.

18. The method of claim 17, wherein the metal is selected from zirconium, molybdenum, beryllium, plutonium, hafnium, cerium, tungsten, thorium, chromium, tantalum, niobium, titanium, yttrium, silicon, aluminum, nickel, cobalt, scandium, bismuth, and copper.

19. The method of claim 17, further comprising forming the nuclear fuel element to comprise an increasing concentration of the metal with an increasing distance from a center of the nuclear fuel element.

20. The method of claim 17, further comprising forming a third region comprising the metal and the additional element between the second region and the outer region.

* * * * *